(12) United States Patent
Forrester

(10) Patent No.: US 7,747,776 B2
(45) Date of Patent: *Jun. 29, 2010

(54) SYSTEM, METHOD AND PROGRAM PRODUCT TO ROUTE MESSAGE PACKETS

(75) Inventor: Jason Davis Forrester, Highlands Ranch, CO (US)

(73) Assignee: International Business Machines Corporation, Armonk, NY (US)

( * ) Notice: Subject to any disclaimer, the term of this patent is extended or adjusted under 35 U.S.C. 154(b) by 138 days.

This patent is subject to a terminal disclaimer.

(21) Appl. No.: 12/184,279

(22) Filed: Aug. 1, 2008

(65) Prior Publication Data

US 2008/0288656 A1 Nov. 20, 2008

Related U.S. Application Data

(63) Continuation of application No. 11/015,165, filed on Dec. 17, 2004, now Pat. No. 7,447,796.

(51) Int. Cl.
*G06F 15/173* (2006.01)
*H04L 12/26* (2006.01)

(52) U.S. Cl. ............. 709/238; 709/223; 709/230; 370/351

(58) Field of Classification Search ........... 709/223, 709/224, 237, 238, 239; 370/351
See application file for complete search history.

(56) References Cited

U.S. PATENT DOCUMENTS

| 5,914,953 | A | 6/1999 | Krause et al. |
| 6,047,330 | A | 4/2000 | Stracke, Jr. |
| 6,505,254 | B1 | 1/2003 | Johnson et al. |
| 7,035,217 | B1 | 4/2006 | Vicisano et al. |
| 7,089,323 | B2 | 8/2006 | Theimer et al. |
| 7,111,072 | B1 | 9/2006 | Matthews et al. |
| 7,251,681 | B1 | 7/2007 | Gourlay |
| 2003/0055982 | A1 | 3/2003 | Noro et al. |
| 2003/0058839 | A1 | 3/2003 | D'Souza |
| 2003/0140248 | A1 | 7/2003 | Izatt |

OTHER PUBLICATIONS

Notice of Allowance (Mail Date Jun. 25, 2008) for U.S. Appl. No. 11/015,165, filed Dec. 17, 2004.

*Primary Examiner*—Saleh Najjar
*Assistant Examiner*—Farzana Huq
(74) *Attorney, Agent, or Firm*—Schmeiser, Olsen & Watts; Arthur J. Samodovitz

(57) ABSTRACT

A system, method and computer program for routing a response packet in a session along a path similar to a request packet's outbound path that includes a firewall and a first router. The firewall receives the request packet and forwards the request packet to the first router. Upon receipt of the request packet, the firewall and first router broadcast session information to their respective sets of directly connected devices. A second router receives the response packet. After determining that the second router was not in the outbound path according to the second router's session table, the second router forwards the response packet to the device (i.e., the firewall or the first router) that is most upstream in the outbound path among the outbound path devices that are available and connected to the second router.

18 Claims, 4 Drawing Sheets

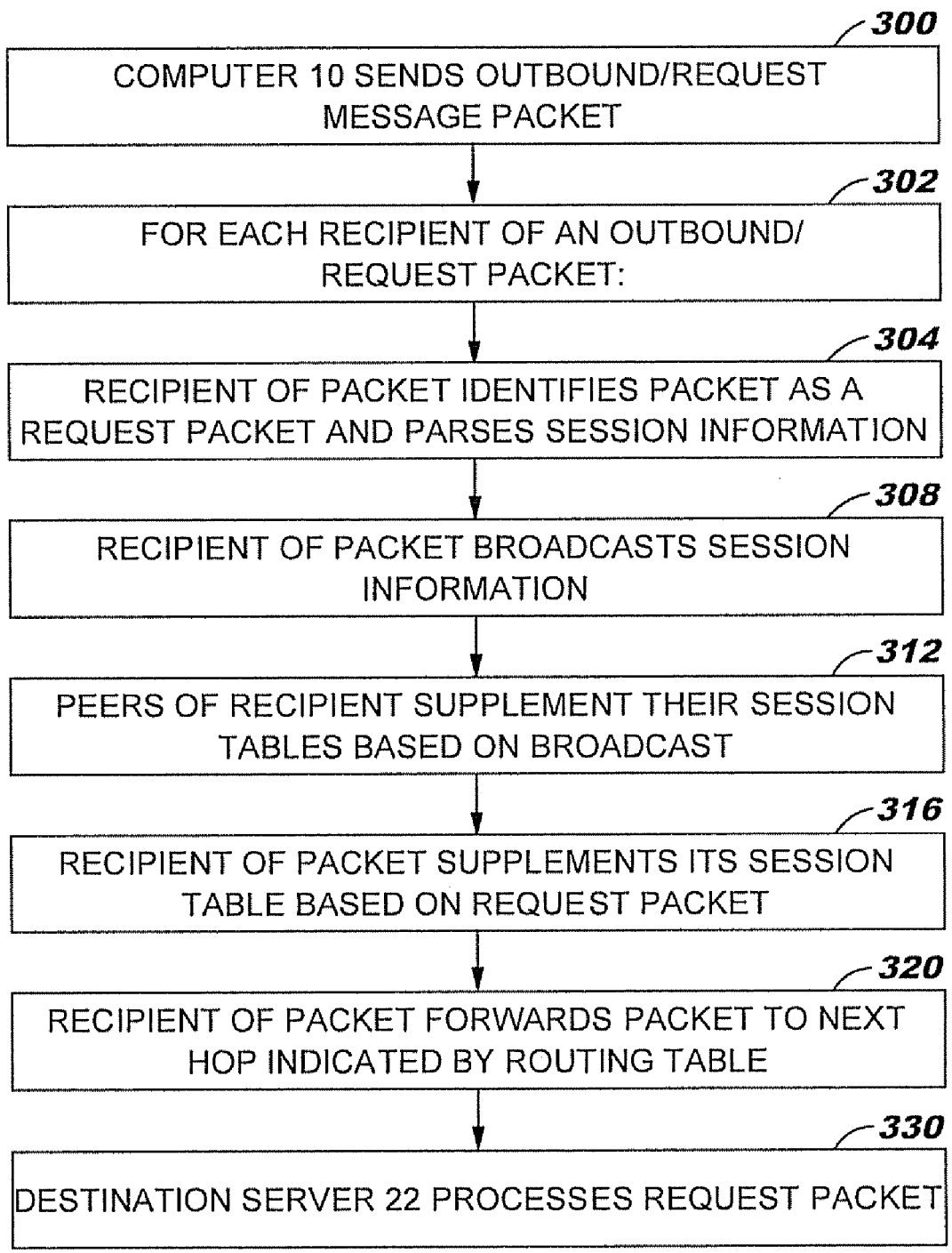

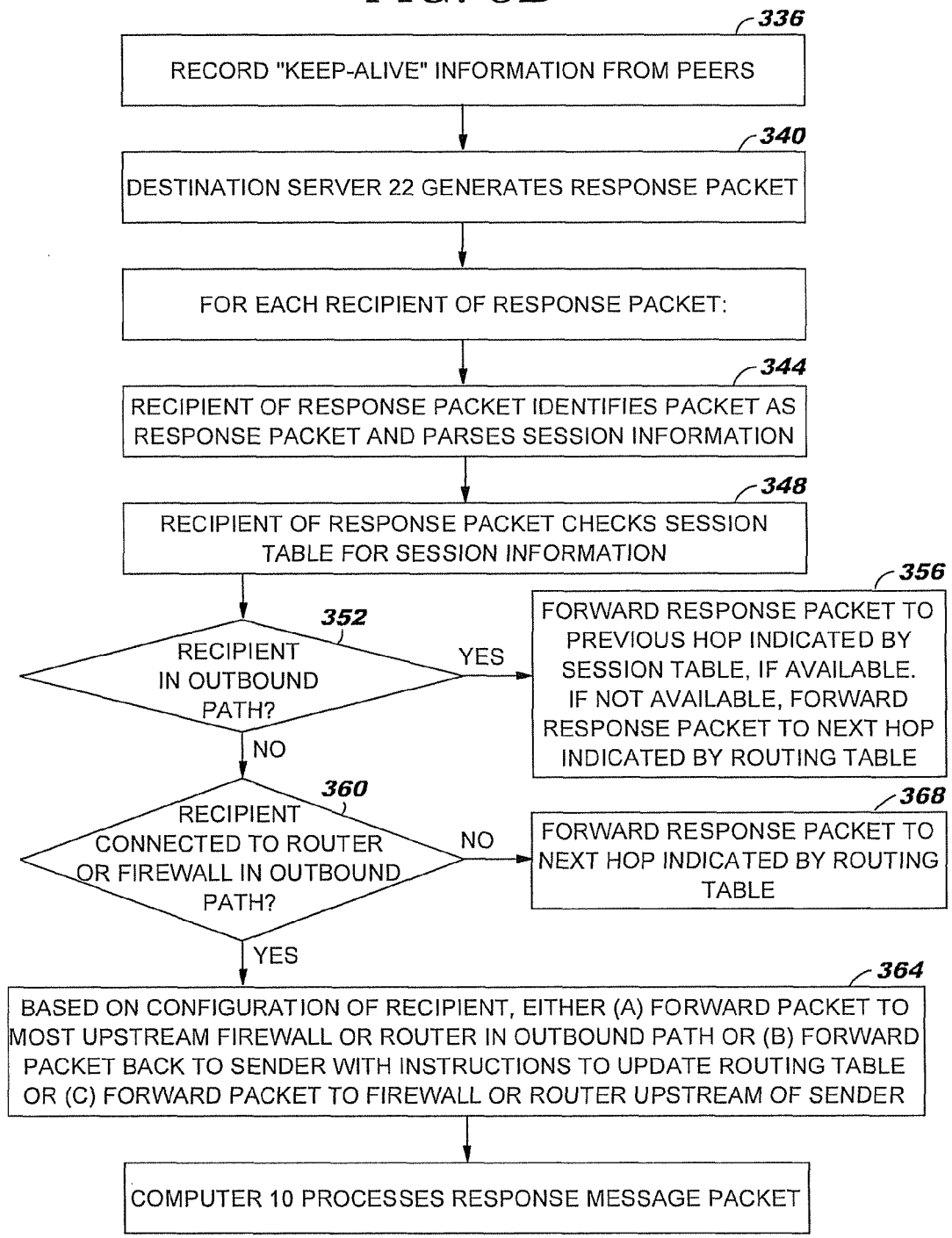

SYSTEM, METHOD AND PROGRAM PRODUCT TO ROUTE MESSAGE PACKETS

This application is a continuation application claiming priority to Ser. No. 11/015,165, filed Dec. 17, 2004.

BACKGROUND OF THE INVENTION

The invention relates generally to computer systems, and deals more particularly with a technique to route message packets.

Digital communication today often uses protocols such as TCP/IP in which a message is divided into packets. Each of the packets includes a portion of the message along with a header that indicates a destination and sequence number of the packet in the message. The packets are routed from a source node via one or more intermediary firewalls and routers to the destination node. The source node may reside in a network protected by the firewall to filter out unwanted messages. In such a case, the firewall is located between the network which it protects and the Internet or other routers and network(s) leading to the destination node. For firewall load balancing, high availability and other purpose, there may be two or more firewalls for a single network. There are often many possible routes (i.e. series of routers) between the source node or source network and the destination node or destination network.

With an asynchronous routing protocol such as TCP/IP, it is common for the request message packets to traverse one route from the source to the destination, and the response message packets to traverse a different route from the destination to the source. Each route is typically based on a routing table within each router and firewall. In such cases where there is an asynchronous routing protocol and more than one firewall for the source node or source network, it is possible for the request message packets to exit the network through one firewall for the source, and the response message packets to arrive at another firewall for the source.

In the TCP/IP protocol, when the request message packets exit the source node or source network via one of the firewalls, this firewall records a session ID under which the request message packets are being sent. The response message packets will include the same session ID. However, if the response message packets arrive at another firewall, even another firewall for the source node or source network of the original message packets, this other firewall may not recognize the response message session ID. In such a case, this other firewall will not forward the response message packets to the source node or source network of the request message packets.

FIG. 1 illustrates a prior art example of the foregoing problem. A user on user/source computer 10 creates a request message packet 13 with source IP address 10.0.0.4 and destination IP address 10.1.1.5. In this standard naming convention, "10.0.0" represents network 12 on which user computer 10 resides, and "0.4" represents user computer 10. Likewise, "10.1.1." represents network 21 on which destination server 22 resides, and "0.5" represents destination server 22. There is a message routing table within user computer 10, based on the configuration of user computer 10, which sends this message packet to Virtual Routing Redundant Protocol ("VRRP") address 10.0.0.1. This VRRP address is the virtual IP address of either firewall 14 or firewall 15, determined as follows. Firewalls 14 and 15 previously negotiated between themselves as to which one will handle/route message packets with VRRP 10.0.0.1. If that firewall 14 or 15 goes down (and does not respond to a "heartbeat" message sent from the other firewall), then the other firewall will handle the message packet with VRRP virtual address 10.0.0.1 or 10.1.1.X. In the illustrated example, firewall 14 is currently the "active" firewall (as between firewalls 14 and 15) configured to receive message packets with VRRP virtual addressed 10.0.0.1 or 10.1.1.X. So, firewall 14 receives the request message packet from user computer 10. Before forwarding the request message packet toward destination server 22, firewall 14 records "state" information about the message packet. This state information comprises session ID, packet sequence number, source IP address and destination IP address. The session ID is the identity of the session opened by user computer 10 to send the request message packets and receive the response message packets. A single message may have been divided into multiple packets, so the packet sequence number identifies the position of each packet in the message. In TCP/IP, the session remains active under normal operating conditions until the firewall 14 receives the complete response message from the destination server. (However, if the destination server does not respond within a predetermined amount of time, the session will time-out.) Firewall 14 has a table which specifies a path to the destination IP address or at least the next hop router or firewall to send the message packets toward the destination IP address. This table can be compiled using well known OSPF, RIP, EIGRP, IGRP, BGP, STATIC or IS-IS routing protocol. In the illustrated example, the table indicates that router 16 is the next hop router, so firewall 14 sends the request message packet to router 16. Likewise, router 16 has a table which specifies a path to the destination IP address or at least the next hop router or firewall to send the message packets toward the destination IP address. This table can also be compiled using OSPF, RIP, EIGRP, IGRP, BGP, STATIC or IS-IS routing protocol. In the illustrated example, the table indicates that router 18 is the next hop router, so router 16 sends the request message packet to router 18. Likewise, router 18 has a table which specifies a path to the destination IP address or at least the next hop router or firewall to send the message packets toward the destination IP address. This table can also be compiled using OSPF, RIP, EIGRP, IGRP, BGP, STATIC or IS-IS routing protocol. In the illustrated example, the table indicates that firewall 20 is the next hop firewall, so router 18 sends the request message packet to firewall 20. Likewise, firewall 20 has a table which specifies a path to the destination IP address. This table can also be compiled using OSPF, RIP, EIGRP, IGRP, BGP, STATIC or IS-IS routing protocol. In the illustrated example, the table indicates that firewall 20 can send the message packet directly to the destination IP address, i.e. IP address 10.1.1.5 of destination server 22, so firewall 20 sends the message packet to destination server 22.

Each message packet includes one or more of the following parameters:

SIN—indicates that the message is an original request, such as a request for information or action, not a response to another message.

FIN—indicates that the sender is finished with the connection, so the session can be terminated.

RST—is a request to reestablish the connection because something has gone wrong with the original connection.

ACK—is a (response) acknowledgment that the request message packet was received.

Session ID—is the identification of the session and is included in all message packets, both those from user computer 10 to server 22, and those from server 22 to user 10.

SINACT—indicates that the packet is a response message packet, and contains part or all of the data responsive to the complete request message. This is the data generated by the destination server after it receives and handles the complete message received from the user computer. By way of example, the data can be a web page in the case where destination server is a web server.

The following illustrates an example according to a prior art return routing which illustrates the problem with the prior art. The message sent from user computer 10 passed through firewall 14, so firewall 14, not firewall 16, recorded the state information. After the request message packet was forwarded to destination server 22 via router 14, router 16 and firewall 20, destination server 22 creates a responsive message. This responsive message comprises a number of message packets each with source IP address 10.1.1.5 and destination IP address 10.0.0.4. There is a message routing table within the server computer 22, based on the configuration of server computer 22, which sends each message packet to Virtual Routing Redundant Protocol ("VRRP") address 10.1.1.1. This VRRP address is the virtual IP address of either firewall 20 or firewall 24, determined as follows. Firewalls 20 and 24 previously negotiated between them as to which one will handle/route message packets with VRRP 10.1.1.1, as long as this firewall is active. However, if the designated firewall goes down (and does not respond to a "heartbeat" message sent from the other firewall), then the other firewall will handle the message packet with VRRP virtual address 10.1.1.1. In the illustrated example, firewall 20 is currently the active firewall (as between firewalls 20 and 24) and is configured to receive message packets with VRRP virtual addressed 10.1.1.1. So, firewall 20 receives the message packet from server computer 22.

As explained above, firewall 20 has a routing table which specifies a routing path to the response-destination IP address (i.e. the IP address of computer 10) or at least the next hop (router or firewall) to send the response message packets toward the response-destination IP address (i.e. the IP address of computer 10). This table can be compiled using well known OSPF, RIP, EIGRP, IGRP, BGP, STATIC or IS-IS routing protocol. In the illustrated example, the table indicates that router 18 is the next hop router, so firewall 20 sends the message packet to router 18. Likewise, as explained above, router 18 has a table which specifies a path to the response-destination IP address or at least the next hop (router or firewall) to send the message packet toward the response-destination IP address. This table can also be compiled using OSPF, RIP, EIGRP, IGRP, BGP, STATIC or IS-IS routing protocol. In the illustrated example, the table indicates that router 28 is the next hop router, so router 18 sends the message packet to router 28. (It may be the case that the communication path from router 18 to router 16 is down or congested, or for some other reason slower than the path to router 28, so the table in router 18 selects router 28 as the next hop.) Likewise, router 28 has a table which specifies a path to the response-destination IP address or at least the next hop (router or firewall) to send the message packets toward the destination IP address. This table can also be compiled using OSPF, RIP, EIGRP, IGRP, BGP, STATIC or IS-IS routing protocol. In the illustrated example, the table indicates that firewall 15 is the next hop firewall, so router 28 sends the message packet to firewall 15.

As noted above, firewalls 14 and 15 are both "stateful"; for security reasons they restrict handling and forwarding of certain response message packets to those with session IDs known to the firewall based on handling of the request message packets. In a restrictive example, firewall 15 will only handle and forward responsive-type message packets which are a response to message packets that previously resulted from a session with user computer 10 where the firewall 15 knows of the session. In many cases this is too restrictive, so firewalls 14 and 15 can be configured as stateful for certain types of response messages, but not others. For example, response message packets sent to certain applications within user computer 10 may be limited based on session IDs known to the firewall which receives the response message packet, but response message packets sent to other applications within user computer 10 may not be so limited by their session ID. In either scenario, whenever firewall 14 or 15 receives a message packet that does not include a SIN, FIN, RST or ACK indicator, the firewall assumes the message packet is a response to a request message sent previously. So, firewall 15, upon receipt of the response message packet, checks its list of session IDs of active sessions, to determine if firewall 15 forwarded the previous, corresponding request message packets. If so, i.e. the stateful firewall 15 has a record of this session ID, and the firewall 15 will forward it to the next hop, in this case user computer 10. However, in the illustrated example, the stateful firewall 15 does not have a record of this session ID (because the original request message packet from user computer 10 went through firewall 14), so firewall 15 will discard the message packet, i.e. erase it and not forward it to user computer 10 or anywhere else. Consequently, user computer 10 does not receive this responsive message packet from server computer 22.

It was previously known for each firewall of a firewall cluster to notify the other firewalls in the cluster of every session of which it learns through receipt of an outbound/request message packet. Consequently, if a responsive message packet arrives at a stateful firewall which did not handle the outbound/request message packets, this firewall will still recognize the session, so the firewall can accept the message packet and forward it to the destination.

For some applications, where uniform quality of service is required, it is desirable for all the packets of a message to follow the same or nearly the same path from a source to a destination, to the extent the path is available. However, the routing tables in the firewalls and routers will continually strive to select the fastest path and will avoid routers and firewalls which are down or congested. While the fastest path may be desirable in many circumstances, for uniform quality of service, path consistency may be preferred.

It was also previously known to attempt to cause a response message packet to follow the same path used by the outbound/request message. However, in some cases, one or more routers or firewalls in this path are unavailable, so it is not possible for the response message to follow the same path used by the outbound/request message. In such a case, a TCP/IP communication program which utilizes the VRRP protocol will learn of the failure of this device when the failed device does not respond to its periodic hello message. Then, the TCP/IP communication program will update its routing tables accordingly to prevent the message from being sent to the failed device again (unless the failed device responds to a subsequent hello message).

An object of the present invention is to provide a system, method and program to route response message packets along a same or similar path as used by the outbound/request message packets in the same session to the extent practical.

SUMMARY OF THE INVENTION

The invention resides in a system, method and computer program for routing a response message packet. The response message packet is a response to a request message packet which traveled along an outbound path from a source computer to a destination computer. The outbound path comprises a first firewall for the source computer and a first router coupled to the first firewall. In response to the first firewall receiving the request message packet, the firewall broadcasts to a first plurality of peer firewall(s) and/or router(s) a session of the request message packet and an identity of the firewall. In response, the first plurality of peer firewall(s) and/or router(s) records the session of the request message packet and that the first firewall was a first hop in the outbound path. The first firewall forwards the request message packet to the first router. In response, the first router broadcasts to a second plurality of peer firewall(s) and/or router(s) a session of the message packet and an identity of the first router. In response, the second plurality of peer firewall(s) and/or router(s) records the session of the request message packet and that the first router was a second hop in the outbound path. In response to a second router of the second plurality of peer firewall(s) and/or router(s) receiving the response message packet, the second router (a) compares a session of the response message packet indicated by the response message packet to the second router's record of the session of the request message packet, (b) determines from the record that the first firewall or the first router was in the outbound path and (c) forwards the response message packet to the first firewall or the first router. The second router was not in the outbound path.

According to one feature of the present invention, the second router is also one of the first plurality of peer firewall(s) and/or router(s). In response to the second router receiving the response message packet, the second router forwards the response message packet to the first firewall.

According to other features of the present invention, in response to the first router receiving the request message packet, the first router records the session of the request message packet and that the first firewall was a previous hop in the outbound path. In response to the first router receiving the response message packet, the first router checks its record to learn that the first firewall was the previous hop in the outbound path, and then forwards the response message packet to the first firewall. The first router periodically sends signals to the second plurality of peer firewall(s) and/or router(s) indicating that the first router is active. The first router was inactive when the second router receives the response message packet and fails to send a signal indicating that the first router is active prior to the second router receiving the response message packet. In response, the second router forwards the message packet to the first firewall.

According to another feature of the present invention, after the first router receives the request message packet from the first firewall and before the response message packet is generated, the first router forwards the request message packet to a third router in the outbound path. In response, the third router broadcasts to a third plurality of peer firewall(s) and/or router(s) a session of the message packet and an identity of the third router. In response, the third plurality of peer firewall(s) and/or router(s) records the session of the request message packet and that the third router was a third hop in the outbound path.

BRIEF DESCRIPTION OF THE DRAWINGS

FIGS. 3(A) and 3(B) form a flow chart illustrating a routing program within each of the firewalls and routers of the computer system of FIG. 2 in accordance with the present invention.

DETAILED DESCRIPTION OF THE INVENTION

Figure 1:
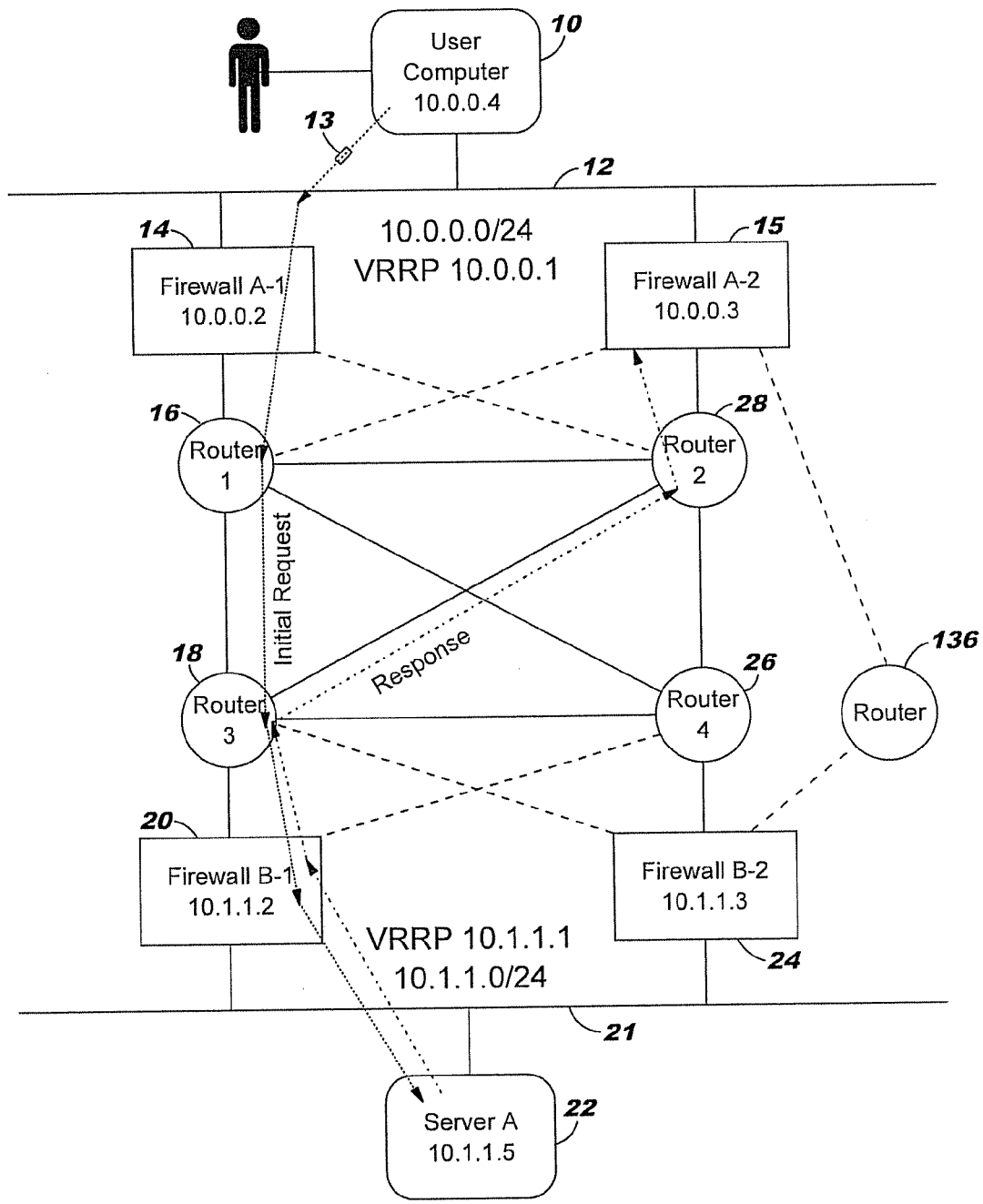
FIG. 1 is a block diagram of a computer system according to the prior art.
Figure 2:
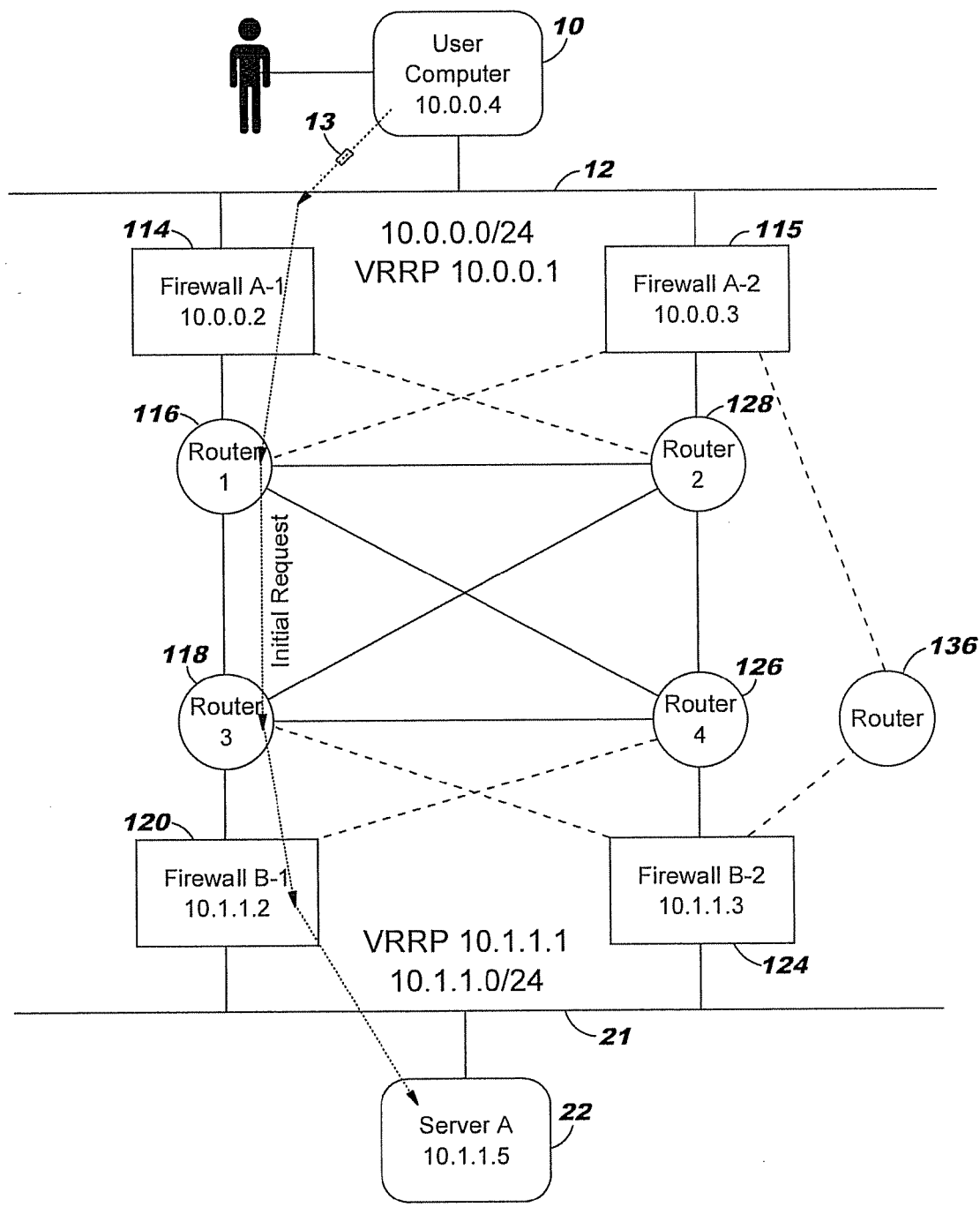
FIG. 2 is a block diagram of a computer system in which the present invention is incorporated.

The present invention will now be described in detail with reference to FIGS. 2, 3(A) and 3(B). FIG. 2 illustrates user computer or node 10 on a network 12. By way of example, network 12 is a LAN, WAN, MAN or the Internet. FIG. 2 also illustrates firewalls 114 and 115 for network 12. Among other things, firewalls 114 and 115 filter unwanted message packets en route to network 12 and filter some outgoing message packets as well. Firewalls 114 and 115 also include respective router functions to route message packets to a destination IP address if the destination address is adjacent to the firewall, or to a "next hop" router en route to a destination IP address if the destination address is not adjacent to the firewall 114 or 115. In the illustrated example, the destination address, server 22, is not adjacent to either firewall 114 or 115, so firewalls 114 and 115 cannot route message packets directly to the destination address. Instead, firewalls 114 and 115 route the message packets through adjacent, intermediary, next hop, routers such as routers 116 and 128 as described below. (FIG. 2 illustrates, through solid and broken lines, that firewall 114 is directly connected to both routers 116 and 128, and that firewall 115 is directly connected to both routers 116 and 128. However, in the illustrated example, based on firewall 114's routing table at the current time, firewall 114 uses router 116 for outbound message packets en route to server 22, and based on firewall 115's routing table at the current time, firewall 115 uses router 128 for outbound message packets en route to server 22.) FIG. 2 also illustrates routers 118 and 126, which among other things, route message packets to a destination address, if the destination address is directly connected, or to a "next hop" router or firewall en route to a destination IP address, if the destination address is not directly connected. In the illustrated example, routers 118 and 126 are not directly connected to destination server 22. FIG. 2 also illustrates server 22 on network 21. By way of example, network 21 is a LAN, WAN, MAN or the Internet. FIG. 2 also illustrates firewalls 120 and 124 for network 21. Among other things, firewalls 120 and 124 filter unwanted message packets en route to network 21 and filter some outbound message packets from network 21. Firewalls 120 and 124 also include respective router functions to route message packets to a destination IP address, if the destination address is directly connected to the firewall, or to a "next hop" router en route to a destination IP address, if the destination address is not directly connected to the firewall. Each of the firewalls 120 and 124 is directly connected to destination server 22.

Each of the firewalls 114, 115, 120 and 124 and routers 116, 118, 126 and 128 also includes known hardware and/or software to periodically send "keep alive" signals to their respective peers (step 336 of FIG. 3(B)). These "keep alive" signals indicate that the sending device (i.e. firewalls 114, 115, 120 and 124 and routers 116, 118, 126 and 128) is still alive/active. If a device fails to send a "keep alive" signal for a certain period of time, then its peers will assume that the device is down, remove the device from the routing table, and replace the device with another, active device leading to a listed destination i.e. determine a productive path around the down device. Each of the firewalls 114, 115, 120 and 124 and routers 116, 118, 126 and 128 also includes hardware and/or software according to the present invention which (a) broadcasts session information about message packets they receive and (b) uses the session information broadcast from other routers and firewalls to ensure that the message packets are reliably forwarded to the intended destination. This process is described in more detail below with reference to FIGS. 3(A) and 3(B).

In the illustrated example, a user creates a message at user computer 10 or an application in user computer 10 creates a message, and known networking hardware and software within user computer 10 divides the message into packets for network transmission. In the illustrated example, each packet 13 has source IP address 10.0.0.4, destination IP address 10.1.1.5, other header information and part of the message data. In this standard naming convention, "10.0.0" represents network 12 on which user computer 10 resides, and ".4" represents user computer 10. Likewise, "10.1.1." represents network 21 on which server 22 resides, and ".5" represents server 22. There is a message routing table within user computer 10, based on the configuration of user computer 10, which sends this message packet to Virtual Routing Redundant Protocol ("VRRP") address 10.0.0.1. This VRRP address is the virtual IP address of either firewall 114 or firewall 115, determined as follows. Firewalls 114 and 115 previously negotiated between themselves as to which one will handle/route message packets with VRRP 10.0.0.1. If that firewall 114 or 115 goes down (and does not respond to a "heartbeat" message sent from the other firewall), then the other firewall will handle the message packet with VRRP virtual address 10.0.0.1 or 10.1.1.X. In the illustrated example, firewall 114 is currently the "active" firewall (as between firewalls 114 and 115) configured to receive message packets with VRRP virtual addressed 10.0.0.1 or 10.1.1.X. So, firewall 114 receives the foregoing message packet from user computer 10 (step 300).

Each message packet includes one or more of the following parameters:

SIN—indicates that the message is an original, outbound request message packet, such as a request for information or action, not a response to another message.

FIN—indicates that the message is outbound (and not original unless a single packet message) and that the sender is finished with the connection, so the session can be terminated.

RST—indicates that the message is outbound or inbound and is a request to reestablish the connection because something has gone wrong with the original connection.

ACK—indicates a (response) message and is an acknowledgment that a request message packet was received. There can be one acknowledgment packet for each request packet, each "x" number of request packets or entire request message (when completely received). This is negotiated at the TCP/IP layer between the user computer 10 and server computer 22.

Session ID—indicates the ID of the session and is included in all message packets, both those from user computer 10 to server 22, and those from server 22 to user 10.

SINACK—indicates that the packet contains part or all of the data responsive to the complete request message. This is the data generated by server 22 after it receives and handles the complete message received from user computer 10. By way of example, the data can be a web page in the case where server 22 is a web server.

FIGS. 3(A) and 3 (B) illustrates routing and processing of the foregoing message packet in more detail. As explained above, computer 10 sends the outbound/request message packet to VRRP 10.0.0 (step 300). Upon receipt of the message packet, firewall 114 determines based on the foregoing parameters whether the packet is part of an outgoing/request message or conversely, part of an incoming/responsive message packet (decision 304). The SIN, FIN and RST parameter in the message packet indicate an outgoing/request message. The ACK and SINACK parameters in the message packet indicate an incoming/responsive message.

The following steps of FIG. 3(A) apply when the message packet is an outbound/request message packet. Steps 304-320 are repeated (see step 302) for each firewall and router between source computer 10 and destination server 22 that handles the outbound/request message packet en route to server 22. When firewall 114 receives the request message packet, firewall 114 parses the header to learn that this is a request message packet, as indicated by the SIN, FIN or RST parameters, and to learn the session information (step 304). The session information comprises the session ID, packet sequence number, source IP address and destination IP address. The session information also indicates that firewall 114 received the message packet as a hop in the outbound message path. The session ID is for the session opened by user computer 10 with server 22. (In such a case, the first request message from user computer 10 to server 22 can be to establish the session. Subsequent requests in this same session can be requests from user computer 10 for data from server 22.) As explained above, a single message may have been divided into multiple packets, so the packet sequence number identifies the position of each packet in the message. In TCP/IP, the session remains active under normal operating conditions until the firewall 114 receives the response from the destination server. (However, if the destination server does not respond within a predetermined amount of time, the session will time-out.) After parsing the session information, firewall 114 broadcasts to its peers the session information, i.e. its own IP address, the session ID, source IP address, destination IP address and a date/time stamp of the original broadcast by the device (step 308). The IP address of firewall 114 in the session information indicates that firewall 114 received the actual request message packet. In other words, the IP address of firewall 114 in the session information indicates that firewall 114 was a hop in the outbound request packet path. The "peers" are the directly connected routers and firewalls. In the illustrated example, firewall 115, router 116 and router 128 are the peers of firewall 114. Firewall 114 periodically rebroadcasts the session information to its peers for the benefit of any of the peers that were not running during the initial broadcast. On startup of each (peer) router or firewall and thereafter, each router and firewall listens for such broadcasted session information and makes a corresponding entry in a "session" table (step 312). For each session, the session table in each router and firewall lists the session ID, source IP address, destination IP address, IP address of the router or firewall that broadcast the session information, and date/time stamp. Firewall 114 also includes a session table which firewall 114 updates with the session information (step 316). Firewall 114 also has a "routing" table which specifies a path to the destination IP address (i.e. server 22) or at least the next hop (router or firewall) to send the message packets toward the destination IP address. This routing table can be compiled using well known OSPF, RIP, EIGRP, IGRP, BGP, STATIC or IS-IS routing protocol. This routing table in firewall 114 is prior art. After broadcasting the session information to its peers (and the peers making entries in their session tables to indicate firewall 114 as a recipient of the message packet and broadcaster of the session information), and supplemented its own session table, firewall 114 sends the request message packet to the next hop router indicated by the routing table (step 320). In the illustrated example, the routing table of firewall 114 indicates that router 116 is the next hop router, so firewall 114 sends the request message packet to router 116.

The foregoing steps 304-320 are repeated for router 116. In response to the request message packet sent by firewall 114 to router 116, router 116 parses the header to learn that this is a request message packet as indicated by the SIN, FIN or REST parameters, and to learn the session information (step 304). This session information comprises the session ID, packet sequence number, source IP address and destination IP address. The session information also indicates that firewall 114 was the previous hop of the session information. Then, router 116 broadcasts the session information to all its peers (step 308), and the peers record the session information in their respective session tables (step 312). The session information broadcast by router 116 and recorded by its peers comprises the broadcaster's IP address (in this case, router 116's IP address), the source IP address, the destination IP address, the session ID and date/time stamp of original broadcast by router 116. In the illustrated example, firewall 114, firewall 115, router 118, router 126 and router 128 are the peers (although typically, there are more peers). So, the session tables in firewall 114 and router 116 and the peers that received the broadcast from both firewall 114 and router 116 indicate both hops of the outbound request message path and the order of the hops (based on the respective date/time stamps). The session tables in routers 118 and 126 will only record the router 116 hop in the outbound request message path (because routers 118 and 126 were not peers of firewall 114). In addition to broadcasting the session information, router 116 enters the session information into its session table including an indication that it was the next hop after firewall 114 (step 316). Router 116 also has a "routing" table which specifies a path to the destination IP address or at least the next hop router or firewall to send the message packets toward the destination IP address. This routing table can be compiled using well known OSPF, RIP, EIGRP, IGRP, BGP, STATIC or IS-IS routing protocol. This routing table in router 116 is prior art. After broadcasting the foregoing session information to its peers (and the peers making entries in their session tables), and recording the session information in its own session table, router 116 sends the request message packet to the next hop router indicated by the routing table (step 320). In the illustrated example, the routing table of router 116 indicates that router 118 is the next hop router, so router 116 sends the request message packet to router 118.

The foregoing steps 304-320 are repeated for router 118. In response to the message packet sent by router 116 to router 118, router 118 parses the header to learn that this is a request message packet as indicated by the SIN, FIN or REST parameters, and to learn the session information (step 304). This session information comprises the session ID, packet sequence number, source IP address and destination IP address. The session information also indicates that router 118 was the next hop in the outbound message packet path. Then, router 118 broadcasts the session information to all its peers (step 308), and the peers record the session information in their respective session tables (step 312). The session information broadcast by router 118 and recorded by its peers comprises the broadcaster's IP address (in this case, router 118's IP address), the source IP address, the destination IP address, the session ID and date/time stamp of original broadcast by router 118. In the illustrated example, router 116, firewall 120, router 126, router 128 and firewall 124 are the peers. The session tables in router 116 and router 128 (and any other peers that received the broadcast from firewall 114, router 116 and router 118) indicate all three hops of the outbound request message packet and the order of the hops (based on the respective date/time stamps). Firewall 120 is not directly connected to either firewall 114 or router 116, so firewall 120 at this time only has a record of the receipt by router 118 of the outbound request message packet and the broadcast by router 118 of the session information. In addition to broadcasting the session information, router 118 enters the session information into its session table including an indication that it was the next hop after router 116 (step 316). Router 118 also has a "routing" table which specifies a path to the destination IP address or at least the next hop router or firewall to send the message packets toward the destination IP address. This routing table can be compiled using well known OSPF, RIP, EIGRP, IGRP, BGP, STATIC or IS-IS routing protocol. This routing table in router 118 is prior art. After broadcasting the foregoing session information to its peers (and the peers making entries in their session tables), router 118 sends the message packet to the next hop router indicated by the routing table (step 320). In the illustrated example, the routing table of router 118 indicates that firewall 120 is the next hop router, so router 118 sends the request message packet to firewall 120.

The foregoing steps 304-320 are repeated for firewall 120. In response to the request message packet sent by router 118 to firewall 120, firewall 120 parses the header to learn that this is a request message packet as indicated by the SIN, FIN or REST parameters, and to learn the session information (step 304). This session information comprises the session ID, packet sequence number, source IP address and destination IP address. The session information also indicates that router 118 was the previous hop of the request message packet. Then, firewall 120 broadcasts the session information to all its peers (step 308), and the peers record the session information in their respective session tables (step 312). The session information broadcast by firewall 120 and recorded by its peers comprises the broadcaster's IP address (in this case, firewall 120's IP address), the source IP address, the destination IP address, the session ID and date/time stamp of original broadcast by firewall 120. In the illustrated example, router 118, router 126 and firewall 124 are the peers. In addition the session tables of the routers and firewalls that also received broadcasts from firewall 114, router 116 and/or router 118 will include additional session information for these broadcasts. The additional information indicates other segments of the outbound request message path. In the illustrated example, the session tables in router 118, router 126 and firewall 124 will indicate the previous hop of the outbound message path through router 118. The session table in router 118 and router 126 will also indicate the previous hop of the outbound message through router 116 (and the order of the hops based on the respective date/time stamps). Firewall 120 is not directly connected to firewall 114 or router 116, so firewall 120 at this time only has a record of the receipt by router 118 of the outbound request message packet and the broadcast by router 118 of the session information. In addition to broadcasting the session information, firewall 120 then enters the session information into its session table including an indication that it was the next hop after router 118 (step 316). Firewall 120 also has a "routing" table which specifies a path to the destination IP address or at least the next hop (router, firewall or destination server) to send the message packets toward the destination IP address. This routing table can be compiled using well known OSPF, RIP, EIGRP, IGRP, BGP, STATIC or IS-IS routing protocol. This routing table in firewall 120 is prior art. After broadcasting the foregoing session information to its peers (and the peers making entries in their session tables), and firewall 120 supplementing its session table, firewall 120 sends the message packet to the next hop indicated by the routing table (step 320). In the illustrated example, the routing table of firewall 120 indicates that server 22 is the next hop, so firewall 120 sends the request message packet to server 22.

Upon receipt of the foregoing request message packet, server 22 processes the request message packet (step 330). Server 22 may generate an acknowledgment (response) message packet indicating that the foregoing request message packet was received (step 340). In such a case, server 22 initiates sending of the acknowledgment message packet to user computer 10 as described below with reference to FIG. 3(B). If this is the last message packet to form an entire request message, server 22 also reads and handles the request. The request may be for data or another service. After handling the request, server 22 generates a responsive message (which generally includes data) (step 340), and divides the responsive message into one or more packets. Response packets are transmitted to computer 10, as described below with reference to FIG. 3(B).

The following steps illustrated in FIG. 3(B) apply for either type of response message packet, and are performed by each firewall and router between server 22 and computer 10 that receives the response message packet en route to computer 10. In the illustrated example, the first response message packet is generated by server 22 and sent to firewall 120 as follows. This responsive message comprises one or more message packets each with source IP address 10.1.1.5 and destination IP address 10.0.0.4. The acknowledge message is typically a single packet, whereas the substantive response to a complete request message is typically multiple packets. In the preferred embodiment of the present invention, server 22 does not have or use a session table, and does not record the path taken by the outbound/request message packet. Instead, there is a known message routing table within the server computer 22, based on the configuration of server computer 22, which sends each message packet to Virtual Routing Redundant Protocol ("VRRP") address 10.1.1.1. This VRRP address is the virtual IP address of either firewall 120 or firewall 124, determined as follows. Firewalls 120 and 124 previously negotiated between them as to which one will handle/route message packets with VRRP 10.1.1.1, as long as this firewall is active. However, if the designated firewall goes down (and does not respond to a "heartbeat" message sent from the other firewall), then the other firewall will handle the message packet with VRRP virtual address 10.1.1.1. In the illustrated example, firewall 120 is currently the active firewall (as between firewalls 120 and 124) and is configured to receive message packets with VRRP virtual address 10.1.1.1. So, firewall 120 receives the response message packet from server computer 122. The response message packet will include an ACK or SINACK parameter in its header.

Where the message packet is a response message packet as indicated by the ACK or SINACK parameter, firewall 120 parses the message packet header to learn that this is a response message packet, and to learn the session ID of the message packet (step 344). Then, firewall 120 checks its session table to determine if firewall 120 has a record of this session (decision 348), either from previously receiving a message packet in this session or receiving a broadcast of the session information for this session. In the illustrated example, firewall 120 should have a record of this session in its session table from the previous broadcast from router 118 and also from subsequently receiving the outbound request message packet in this session. This record should indicate that router 118 was the previous hop of the outbound/request message packet, before arriving at firewall 120, i.e. router 118 was in the outbound/request message path (decision 352, yes branch). In other words, the session table in firewall 120 indicates that router 118 previously forwarded to firewall 120 the outbound/request message packet for which the current message packet is a response packet. In accordance with the present invention, the same path should be followed in reverse by the response message packet, if practical. If router 118 is active, firewall 120 forwards the response message packet to router 118 (step 356, first decision). (However, if router 118 is not active (step 356, second decision, as indicated by the lack of a keep alive signal for a predetermined period), then firewall 120 will instead forward the response message packet to the next hop indicated by the routing table of firewall 120, as described below.)

After receiving the response message packet from router 118, router 116 parses the message packet header to learn that this is a response message packet, and to learn the session information of the message packet (step 344). Then, router 116 checks its session table to determine if router 116 has a record of this session (decision 348), either from previously receiving a message packet in this session or receiving a broadcast of the session information for this session. In the illustrated example, router 116 should have a record of this session in its session table from the previous broadcast from firewall 114 and also from subsequently receiving the outbound request message packet in this session. This record should indicate firewall 114 was the previous hop of the outbound/request message packet, before arriving at router 116. In other words, the session table in router 116 indicates firewall 114 previously forwarded to router 116 the outbound/request message packet for which the current message packet is a response packet (decision 352, yes branch). In accordance with the present invention, the same path should be followed in reverse by the response message packet, if possible. So, router 116 forwards the response message packet to firewall 114. (However, if firewall 114 is not active (step 356, second decision, as indicated by the lack of a keep alive signal for a predetermined period), then router 116 will forward the response message packet to the next hop indicated by the routing table of router 116.)

After receiving the response message packet from router 116, firewall 114 parses the message packet header to learn that this is a response message packet, and the session information of the message packet (step 344). Then, firewall 114 checks its session table to determine if firewall 114 has a record of this session (decision 348), either from previously receiving a message packet in this session or receiving a broadcast of the session information for this session. In the illustrated example, firewall 114 should have a record of this session in its session table from receiving the outbound request message packet in this session. This record should indicate that computer 10 was the previous hop/source of the outbound request message packet, before arriving at firewall 114. In other words, the session table in firewall 114 indicates that computer 10 previously forwarded to firewall 114 the outbound/request message packet for which the current response message packet is a response packet (decision 352, yes branch). In accordance with the present invention, the same path should be followed in reverse by the response packet, if possible. So, firewall 114 forwards the response message packet to computer 10.

The foregoing processing by firewall 120, router 118, router 116 and firewall 114 of the response message packet occur when there are no problems with the outbound message packet path for the response packet, i.e. all of the firewalls and routers in this path are active. The following are examples where one or more of the firewalls and routers in this path are not active for the response message packet:

Consider the case where server 22 initially forwards the response message packet to firewall 124 instead of firewall 120, based on unavailability of firewall 120 or renegotiation of the active firewall as between firewalls 120 and 124. In such a case, firewall 124 determines from the header that this is a response message packet (step 344), checks its session table for an entry for this session (step 348), and learns that firewall 124 was not in the outbound/request message path (decision 352, no branch). Instead, firewall 124 learns that firewall 120 was the last hop in the outbound/request message path, and router 118 was the next to last hop in the outbound/request message packet path. (Firewall 124 does not have visibility further upstream in the outbound request message path because firewall 124 did not receive the outbound message broadcasts from either firewall 114 or router 116.) In one embodiment of the present invention indicated by a routing configuration option in firewall 124, because firewall 124 is directly connected to router 118 and assuming router 118 is still "alive" (decision 360, yes branch), firewall 124 can forward the response message packet to router 118, bypassing firewall 120. This would return the response message packet to the proper, outbound message path (step 364). However, if router 118 is not active, or based on another embodiment of the present invention indicated by the routing configuration option in firewall 124, firewall 124 will send the response message packet to firewall 120, assuming firewall 120 is "alive" (step 364). Firewall 120 will then check its session table (step 348), learn that firewall 120 was in the outbound message path (decision 352, yes branch), and then forward the response message packet to the previous hop in the outbound message path indicated by the session table, i.e. router 118 (step 356). If neither router 118 nor firewall 120 is "alive", then firewall 124 will forward the response message packet to the next hop indicated by the routing table within firewall 124 (step 364). In the illustrated example, assume this is router 126 (although it could be router 136). Upon receipt of the response message packet, router 126 will check its session table for the session ID (steps 344 and 348). In the illustrated example, router 126 will have an entry for this session in its session table based on the previous broadcasts by firewall 120, router 116 and router 118 resulting from the outbound/request message packet in the same session. Then, in one embodiment of the present invention as indicated by the routing configuration option, router 126 will forward the response message packet to the most upstream device in the outbound/request path (decision 360 yes branch and step 364). In the illustrated example, this will be router 116 (decision 352 no branch, decision 360 yes branch and step 364). In another embodiment of the present invention as indicated by the routing configuration option, router will forward the response message packet to a downstream device in the outbound/request path.

Consider the case where router 118 receives the message packet from either firewall 120 or 124 but forwards the response message packet to router 128 instead of router 116, based on unavailability of router 116 (as indicated by the absence of the keep alive signal from router 116). In such a case, router 128 checks its session table for an entry for this session (steps 344 and 348), and learns that router 128 was not in the outbound/request message path (decision 352, no branch). Instead, router 128 learns that router 116 was the last hop before the sender of the response message packet, i.e. router 118, and firewall 114 was the next to last hop in the outbound/request message packet path. (Router 128 does not have visibility further upstream in the outbound request message path to computer 10.) Because router 128 is directly connected to firewall 114, and assuming firewall 114 is still "alive", router 128 can forward the response message packet to firewall 114 (decision 360, yes branch and step 364), and this would return the response message packet to the proper, outbound message path. If router 128 was not directly connected to firewall 114 or any other firewall or router in the outbound/request path (decision 360, no branch) (unlike the illustrated embodiment), router 128 will send the response message packet to router 116, if router 116 is now "alive" (step 364). If neither router 116 nor firewall 114 is now "alive", then router 128 will forward the response packet to the next hop indicated by the routing table within router 128 (step 368). In the illustrated example, this will be firewall 115. Upon receipt of the response message packet, firewall 115 will check its session table for the session ID (step 344). In the illustrated example, firewall 115 will have an entry for this session in its session table based on the previous broadcast by firewall 114 resulting from the outbound/request message packet in the same session (step 348). Then, firewall 115 will forward the message packet to the most upstream device in the outbound/request path. In the illustrated example, this will be computer 10. Alternately as indicated by a routing configuration option, firewall 115, can forward the message packet to firewall 114 to return the response message packet to the outbound message path, if firewall 114 is alive (step 364).

Consider another example, where the response message packet arrives at firewall 115, instead of firewall 114. This could occur in a number of scenarios. For example, in the case where server 22 originally forwarded the response message packet to firewall 124, and both firewall 120 and router 118 were down. Assuming that the routing table in firewall 124 indicated router 136 as the next hop, and router 136 does not have an entry in its session table for this session (because router 136 is not directly connected to any of firewall 114, router 116, router 118 or firewall 120 and did not receive their broadcasts during the outbound/request message packet routing). Router 136 is directly connected to both firewalls 114 and 115 (decision 352, no branch and decision 360, yes branch), but the routing table in router 136 indicates firewall 115 as the next hop. So, when the response message packet arrives at firewall 115, firewall 115 will check its session table to learn that the most upstream hop in the outbound/request message packet path was firewall 114, so firewall 115 can forward the response message packet to firewall 114 (step 364). In response, firewall 114 will check its session table to learn that it has a record of this session and can "accept" this message packet as a legitimate response to an outbound/request message packet, and then forward the response message packet to computer 10 as indicated in the session table in firewall 114. Alternately, because firewall 115 has the session information for this message packet, firewall 115 can "accept" the message packet as a legitimate response to an outbound/request message packet, and forward it directly to computer 10 based on the session table within firewall 115 (step 364).

Based on the foregoing, a system, method and program product for routing response message packets along the outbound/request message path, to the extent available, has been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A method for routing a response message packet in a session, said response message packet being a response to a request message packet that traveled along an outbound path in said session from a source computer to a destination computer, said outbound path comprising a first firewall for said source computer and a first router coupled to said first firewall, said method comprising the steps of:

- in response to receipt of said request message packet by said first firewall, said first firewall broadcasting an identification (session ID) of said session to a first plurality of peer devices including said first router;
- in response to the step of said first firewall broadcasting said session ID to said first plurality of peer devices, said first plurality of peer devices recording said session ID and an indication that said first firewall received said request message packet as a first hop in said outbound path;
- subsequent to the step of said first firewall broadcasting said session ID to said first plurality of peer devices, said first firewall forwarding said request message packet to said first router;
- in response to the step of said first firewall forwarding said request message packet to said first router, said first router broadcasting said session ID to a second plurality of peer devices including said first firewall;
- in response to the step of said first router broadcasting said session ID to said second plurality of peer devices, said second plurality of peer devices recording said session ID and an indication that said first router received said request message packet as a second hop in said outbound path;
- subsequent to the step of said second plurality of peer devices recording said session ID and said indication that said first router received said request message packet as said second hop, said second router receiving said response message packet, wherein said response message packet includes said session ID;
- subsequent to the step of said second router receiving said response message packet, said second router determining that said second router is not in said outbound path based on a session table of said second router not including a record of said second router receiving said request message packet in said outbound path in said session;
- subsequent to the step of said second router receiving said response message packet and based on said session table of said second router, said second router selecting said first firewall or said first router from one or more devices by
  - identifying said one or more devices as being connected to said second router, as having received said request message packet in said outbound path in said session, and as being available to receive said response message packet, and
  - determining that said first firewall or said first router received said request message packet in said session before any other device of said one or more devices received said request message packet in said session; and
- in response to the step of said second router selecting said first firewall or said first router, said second router forwarding said response message packet to a first device, wherein said first device is said first firewall or said first router, as selected by the step of said second router selecting said first firewall or said first router.

2. The method of claim 1, wherein said identifying said one or more devices includes:

- retrieving one or more identifications of said session from said session table of said second router; and
- matching each identification of said one or more identifications of said session to said session ID included in said response message packet, wherein one or more records of said session table associate said one or more identifications of said session with said one or more devices.

3. The method of claim 2, wherein said determining that said first firewall or said first router received said request message packet in said session before any other device of said one or more devices includes:

- retrieving, from said one or more records of said session table, one or more indications of one or more hops in said outbound path; and
- identifying a hop of said one or more hops as preceding any other hop of said one or more hops in said outbound path, wherein said session table associates said hop with said first firewall or said first router.

4. The method of claim 1, wherein said method further comprises a step of subsequent to a generation of said response message packet, a second device that was in said outbound path determining that a third device that was in said outbound path is unavailable to receive said response message packet from said second device, wherein said second device is a device selected from the group consisting of a firewall, a router, and said destination computer, and wherein said third device is a device selected from the group consisting of a firewall and a router.

5. The method of claim 4, wherein said step of said second router receiving said response message packet includes:

- said second router receiving said response message packet subsequent to said step of said second device determining that said third device is unavailable;
- said second router receiving said response message packet based on said third device being unavailable; and
- said second router receiving said response message packet based on said second router being in a routing table of said second device.

6. The method of claim 4, wherein said method further comprises the step of:

- prior to said step of said second device determining that said third device is unavailable to receive said response message packet, said second device periodically receiving a signal from said third device, wherein said signal indicates that said third device is active and available to receive said response message packet from said second device,
- wherein said step of said second device determining that said third device is unavailable to receive said response message packet includes said second device detecting a lack of a receipt of said signal by said second device in a predetermined period of time.

7. The method of claim 1, wherein said first device is said first firewall, wherein said step of said first firewall broadcasting said session ID to said first plurality of peer devices includes said first firewall broadcasting said session ID to said second router, and wherein said step of said second router selecting said first firewall or said first router includes:

- determining that said first firewall is available to receive said response message packet; and
- determining that said first firewall received said request message packet in said session before any other device of said one or more devices received said request message packet in said session.

8. The method of claim 1, wherein said first device is said first router, wherein said first plurality of peer devices does not include said second router, and wherein said step of said second router selecting said first firewall or said first router includes:

determining that said first router is available to receive said response message packet; and determining that said first router received said request message packet in said session before any other device of said one or more devices received said request message packet in said session.

9. The method of claim 1, wherein said first device is said first router, wherein said step of said first firewall broadcasting said session ID to said first plurality of peer devices includes said first firewall broadcasting said session ID to said second router, wherein said step of said first router broadcasting said session ID to said second plurality of peer devices includes said first router broadcasting said session ID to said second router, and wherein said step of said second router selecting said first firewall or said first router includes:

determining that said first firewall is unavailable to receive said response message packet;

determining that said first router is available to receive said response message packet; and determining that said first router received said request message packet in said session before any other device of said one or more devices received said request message packet in said session.

10. A system for routing a response message packet in a session, said response message packet being a response to a request message packet that traveled along an outbound path in said session from a source computer to a destination computer, said outbound path comprising a first firewall for said source computer and a first router coupled to said first firewall, said system comprising:

said first firewall including means for broadcasting, in response to receipt of said request message packet by said first firewall, an identification (session ID) of said session to a first plurality of peer devices including said first router;

said first plurality of peer devices including means for recording, in response to said broadcasting said session ID to said first plurality of peer devices, said session ID and an indication that said first firewall received said request message packet as a first hop in said outbound path;

said first firewall including means for forwarding, subsequent to said broadcasting said session ID to said first plurality of peer devices, said request message packet to said first router;

said first router including means for broadcasting, in response to said forwarding said request message packet to said first router, said session ID to a second plurality of peer devices including said first firewall;

said second plurality of peer devices including means for recording, in response to said broadcasting said session ID to said second plurality of peer devices, said session ID and an indication that said first router received said request message packet as a second hop in said outbound path;

said second router including means for receiving, subsequent to said recording said session ID and said indication that said first router received said request message packet as said second hop, said response message packet, wherein said response message packet includes said session ID;

said second router including means for determining, subsequent to said receiving said response message packet, that said second router is not in said outbound path based on a session table of said second router not including a record of said second router receiving said request message packet in said outbound path in said session;

said second router including means for selecting, subsequent to said receiving said response message packet and based on said session table of said second router, said first firewall or said first router from one or more devices by identifying said one or more devices as being connected to said second router, as having received said request message packet in said outbound path in said session, and as being available to receive said response message packet, and determining that said first firewall or said first router received said request message packet in said session before any other device of said one or more devices received said request message packet in said session; and said second router including means for forwarding, in response to said selecting said first firewall or said first router, said response message packet to a first device, wherein said first device is said first firewall or said first router, as selected by said means for selecting said first firewall or said first router.

11. The system of claim 10, wherein said means for selecting said first firewall or said first router by identifying said one or more devices includes:

means for retrieving one or more identifications of said session from said session table of said second router; and means for matching each identification of said one or more identifications of said session to said session ID included in said response message packet, wherein one or more records of said session table associate said one or more identifications of said session with said one or more devices.

12. The system of claim 11, wherein said means for selecting said first firewall or said first router by determining that said first device received said request message packet in said session before any other device of said one or more devices includes:

means for retrieving one or more indications of one or more hops in said outbound path from said one or more records of said session table; and means for identifying a hop of said one or more hops as preceding any other hop of said one or more hops in said outbound path, wherein said session table associates said hop with said first firewall or said first router.

13. The system of claim 10, further comprising a second device that was in said outbound path, said second device including means for determining, subsequent to a generation of said response message packet, that a third device that was in said outbound path is unavailable to receive said response message packet from said second device, wherein said second device is a device selected from the group consisting of a firewall, a router, and said destination computer, and wherein said third device is a device selected from the group consisting of a firewall and a router.

14. The system of claim 13, wherein said means for receiving said response message packet includes:

means for receiving said response message packet subsequent to said determining that said third device is unavailable;

means for receiving said response message packet based on said third device being unavailable; and means for receiving said response message packet based on said second router being in a routing table of said second device.

15. The system of claim 13, further comprising:

said second device including means for periodically receiving, prior to said determining that said third device is unavailable to receive said response message packet, a signal from said third device, wherein said signal indicates that said third device is active and available to receive said response message packet from said second device, wherein said means for determining that said third device is unavailable to receive said response message packet includes means for detecting a lack of a receipt of said signal by said second device in a predetermined period of time.

16. The system of claim 10, wherein said first device is said first firewall, wherein said means for broadcasting said session ID to said first plurality of peer devices includes means for broadcasting said session ID to said second router, and wherein said means for selecting said first firewall or said first router includes:

means for determining that said first firewall is available to receive said response message packet, and means for determining that said first firewall received said request message packet in said session before any other device of said one or more devices received said request message packet in said session.

17. The system of claim 10, wherein said first device is said first router, wherein said first plurality of peer devices does not include said second router, and wherein said means for selecting said first firewall or said first router includes:

means for determining that said first router is available to receive said response message packet, and means for determining that said first router received said request message packet in said session before any other device of said one or more devices received said request message packet in said session.

18. The system of claim 10, wherein said first device is said first router, wherein said means for broadcasting said session ID to said first plurality of peer devices includes means for broadcasting said session ID to said second router, wherein said means for broadcasting said session ID to said second plurality of peer devices includes means for broadcasting said session ID to said second router, and wherein said means for selecting said first firewall or said first router includes:

means for determining that said first firewall is unavailable to receive said response message packet, means for determining that said first router is available to receive said response message packet, and means for determining that said first router received said request message packet in said session before any other device of said one or more devices received said request message packet in said session.

\* \* \* \* \*